United States Patent
Stohr et al.

(10) Patent No.: US 11,091,139 B2
(45) Date of Patent: Aug. 17, 2021

(54) BLOCKING DEVICE FOR AN ELECTROMECHANICAL SERVICE BRAKE OF A MOTOR VEHICLE, ELECTROMECHANICAL SERVICE BRAKE WITH SUCH A BLOCKING DEVICE AS WELL AS MOTOR VEHICLE WITH SUCH AN ELECTROMECHANICAL SERVICE BRAKE

(71) Applicant: IMS Gear SE & Co. KGaA, Donaueschingen (DE)

(72) Inventors: Johannes Stohr, Villigen-Schwenningen (DE); Klaus Fahrlander, Aldingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 49 days.

(21) Appl. No.: 16/703,981

(22) Filed: Dec. 5, 2019

(65) Prior Publication Data
US 2020/0180582 A1 Jun. 11, 2020

(30) Foreign Application Priority Data
Dec. 6, 2018 (EP) .................................... 18210622

(51) Int. Cl.
*F16D 69/00* (2006.01)
*B60T 13/74* (2006.01)
(Continued)

(52) U.S. Cl.
CPC ............ *B60T 13/746* (2013.01); *B60T 1/065* (2013.01); *B60T 17/221* (2013.01);
(Continued)

(58) Field of Classification Search
CPC ............... F16D 65/183; F16D 2127/06; F16D 2129/06; F16D 2129/08; F16D 2125/48;
(Continued)

(56) References Cited

U.S. PATENT DOCUMENTS 9,731,946 B2 * 8/2017 Heil .......................... F16D 48/06
2004/0017190 A1 * 1/2004 McDearmon .......... G01D 5/145
324/207.25
(Continued)

FOREIGN PATENT DOCUMENTS

EP 1460300 9/2004
EP 2842823 3/2015
(Continued)

OTHER PUBLICATIONS

Notification of Reason for Refusal, Korean Patent Office, Korean Patent Application No. KR 2019015978, dated Dec. 17, 2020, with translation.
(Continued)

*Primary Examiner* — Nicholas J Lane
(74) *Attorney, Agent, or Firm* — Akerman LLP; Peter A. Chiabotti (57) ABSTRACT

A blocking device for an electromechanical service brake of a motor vehicle, wherein the electromechanical service brake comprises a ratchet gear, supported rotatably about a rotational axis, which ratchet gear is connected or is connectable torque-proof with a drive shaft, rotatable about the same rotational axis of a power train of the electromechanical service brake, and the blocking device comprises a blocking tappet which is axially movable along a displacement axis between a first position, in which the blocking tappet releases the ratchet gear, and a second position, in which the blocking tappet for the purpose of blocking engages into the ratchet gear, a moving system for moving
(Continued)

the blocking tappet along the displacement axis, and a position determination system for determining the position of the blocking tappet and an electromechanical service brake for a motor vehicle with such a blocking device and to a motor vehicle with such an electromechanical service brake.

15 Claims, 3 Drawing Sheets

(51) Int. Cl.
| | |
|---|---|
| *B60T 1/06* | (2006.01) |
| *B60T 17/22* | (2006.01) |
| *F16D 55/226* | (2006.01) |
| *F16D 65/18* | (2006.01) |
| *F16D 121/24* | (2012.01) |
| *F16D 125/40* | (2012.01) |
| *F16D 125/48* | (2012.01) |
| *F16D 127/06* | (2012.01) |
| *F16D 129/10* | (2012.01) |

(52) U.S. Cl.
CPC .......... *F16D 55/226* (2013.01); *F16D 65/183* (2013.01); *F16D 2121/24* (2013.01); *F16D 2125/40* (2013.01); *F16D 2125/48* (2013.01); *F16D 2127/06* (2013.01); *F16D 2129/10* (2013.01)

(58) Field of Classification Search
CPC ............. F16D 2121/18; F16D 2121/24; F16D 2125/40; G01D 5/145; B60T 13/746
See application file for complete search history.

(56) References Cited

U.S. PATENT DOCUMENTS

| | | | |
|---|---|---|---|
| 2006/0208565 A1* | 9/2006 | O'Neill | B64C 25/42 |
| | | | 303/152 |
| 2015/0041261 A1* | 2/2015 | Masuda | F16D 65/18 |
| | | | 188/163 |
| 2016/0017942 A1 | 1/2016 | Kwon et al. | |
| 2018/0073584 A1 | 3/2018 | Tsukamoto et al. | |
| 2018/0135710 A1* | 5/2018 | Sala | B60T 13/741 |
| 2018/0162330 A1* | 6/2018 | Odaira | B60T 13/745 |

FOREIGN PATENT DOCUMENTS

| | | |
|---|---|---|
| JP | 2013226854 | 11/2013 |
| JP | 2016190626 | 11/2016 |

OTHER PUBLICATIONS

European Patent Office, "European Search Report", issued in European Patent Application No. 18 210622.9, dated May 21, 2019, document of 6 pages.

\* cited by examiner

BLOCKING DEVICE FOR AN ELECTROMECHANICAL SERVICE BRAKE OF A MOTOR VEHICLE, ELECTROMECHANICAL SERVICE BRAKE WITH SUCH A BLOCKING DEVICE AS WELL AS MOTOR VEHICLE WITH SUCH AN ELECTROMECHANICAL SERVICE BRAKE

CROSS-REFERENCE TO RELATED APPLICATIONS

This application claims priority to European Patent Application No. 18 210622.9, filed Dec. 6, 2018, which is incorporated by reference in its entirety.

BACKGROUND

The present patent application relates to a blocking device for an electromechanical service brake of a motor vehicle. The patent application relates furthermore to an electromechanical service brake with such a blocking device for a motor vehicle. The patent application relates, moreover, to a motor vehicle with such an electromechanical service brake.

SUMMARY

Electromechanical service brakes, also known by the term "Brake by Wire", are increasingly employed instead of hydraulically operated brake systems. Reasons therefor are inter alia that electromechanical service brakes make it feasible to brake individual wheels of a particular motor vehicle individually and in simple manner. This can only be accomplished with hydraulically operated brake systems involving great effort and complexity. The technical requirements and expenditures of electromechanical service brakes are generally markedly lower in comparison to hydraulically operated brake systems. The basic structure is limited to a control unit, an electric motor, and an actuator unit developed according to the application case. For example, it is not necessary to provide a brake force booster in the case of electromechanical service brakes. There is, furthermore, also no risk of the hydraulic fluid leaking from porous hydraulic hoses and consequently cannot lead to loss of functional reliability of the brake system. Leaking hydraulic fluid, moreover, represents an environmental hazard.

Modern motor vehicles are in many cases equipped with electromechanical blocking devices that are also termed parking brakes or emergency brakes. These are intended to prevent that the particular motor vehicle starts rolling uncontrollably out of the parked state. Such blocking devices can, furthermore, also be utilized as a starting aid since it is possible to release the blocking devices automatically at a specific point in time, for example if a specific torque is output by the engine of the motor vehicle. The blocking devices are conventionally integrated into the disk brake calipers of the rear wheels of the motor vehicle.

US 2016/0017942 A1 discloses an electromechanical blocking device, in which a blocking tappet (rod) is axially movable along a displacement axis between a first position, in which the blocking tappet releases a ratchet gear, and a second position in which the blocking tappet engages into the ratchet gear for the purpose of blocking. The engagement into the ratchet gear takes place when the electromechanical service brake has pressed the (friction) brake pad onto the brake disk and the motor vehicle has stopped. With the engagement into the ratchet gear the brake pads can no longer be moved away from the brake disk whereby the particular motor vehicle is locked.

Modern electromechanical service brakes have a reaction time of between approximately 0.1 and 0.3 seconds. In order for the electromechanical service brake to be able to cooperate optimally with the blocking device, it is extremely important that it is known at all times whether the ratchet gear is blocked or released. For this purpose, in US 2016/0017942 A1 only the displacement means for moving the blocking tappet can be accessed. However, by doing so it is not possible to determine precisely whether or not the ratchet gear is blocked or released. The cooperation between the electromechanical service brake and the blocking device is consequently not optimal. In particular during the release of the blocking device undesirable effects occur, for example when the driver of the motor vehicle wishes to drive, however, the blocking device is not yet completely released. Quick-jerk accelerations and friction noises may hereby be generated. To avoid such effects, the blocking devices depicted in US 2016/0017942 A1 are operated with a reaction time markedly above the above indicated reaction time of between 0.1 and 0.3 seconds, for example with a waiting time of 1 second. After this time has elapsed, it can be assumed that the blocking device is released. However, here also there are losses in driver comfort in particular during the start-up since the entire service brake correspondingly responds with a time delay.

One embodiment of the present disclosure addresses the problem of specifying a blocking device which can be operated with a lesser reaction time than is the case with the blocking devices known in prior art. Furthermore, one physical form of the present disclosure addresses the problem of providing an electromechanical service brake that can be operated with a blocking device of this nature. Moreover, one development of the disclosure addresses the problem of providing a motor vehicle with such service brake.

This problem of lesser reaction time is resolved with the characteristics specified in the present disclosure. Advantageous embodiments are further recited herein.

One embodiment of the disclosure relates to a blocking device for an electromechanical service brake of a motor vehicle, wherein the electromechanical service brake comprises a ratchet gear rotatably supported about a rotational axis, which ratchet gear is torque-proof connected or connectable with a drive shaft of a power train, rotatable about the same rotational axis, of an electromechanical blocking device. The blocking device comprises a blocking tappet that is axially movable along a displacement axis between a first position, in which the blocking tappet releases the ratchet gear, and a second position, in which the blocking tappet engages the ratchet gear for the purpose of blocking, a moving system for moving the blocking tappet along the displacement axis, and a position determination system for determining the position of the blocking tappet.

Due to the fact that, as proposed, the blocking device comprises a position determination system with which the position of the blocking tappet can be determined at any time, it is also feasible to determine at any time whether or not the blocking tappet is still in engagement with the ratchet gear, and thus blocks the ratchet gear, or whether or not the blocking tappet has released the ratchet gear. Based on the data that are always available in their current and updated form, indicating whether or not the ratchet gear is blocked or released, the entire service brake can be operated with shorter reaction time, in particular because it is not necessary to wait for a specific length of time after which the probability is sufficiently high that the ratchet gear is released.

The proposed blocking device does not determine the reaction time of the entire service brake during the locking and releasing of the blocking device.

The ride and driving comfort during start and stop is noticeably increased by means of the proposed blocking device.

According to a further embodiment the blocking tappet comprises at least one marker region which cooperates with the position determination system for determining the position of the blocking tappet. The marker region can, for example, comprise one or several optically readily identifiable notches which simplify the determination of the position of the blocking tappet. The position determination system can comprise, for example, light barriers that detect whether the notches are located in a first or a second region, based on which conclusions can be drawn regarding the position of the blocking tappet.

In a further developed embodiment the blocking tappet can comprise at least one marker face extending perpendicularly to the direction of motion via which the marker region cooperates with the position determination system. It has been found that with a marker face oriented in such manner, an especially good determination of the position of the blocking tappet can be realized.

In a further developed embodiment the blocking tappet can comprise two marker faces extending parallel to one another, wherein with the first marker face a first marker region and with the second marker face a second marker region is associated. The use of two marker faces results in increased accuracy of the position determination of the tappet since the position determination system can determine the position of the tappet on the basis of two independent measurements. Measuring errors can be detected and eliminated.

In a further embodiment the position determination system can at least be partially disposed between the two marker faces. The disposition of the position determination system at least partially between the two marker faces also enables good detection of the position of the marker faces and consequently permits an especially precise determination of the position of the blocking tappet. Furthermore, a space-saving disposition of the position determination system can hereby be realized.

At least one marker region can herein be magnetized or magnetizable. In this embodiment the position of the blocking tappet can be determined based on the change of the magnetic field, for the purpose of which a magnetometer can be employed.

A further developed embodiment is distinguished thereby that the first marker region is developed as a first magnet and the second marker region as a second magnet. In this embodiment the position of the blocking tappet can also be determined based on measurements of the magnetic field whereby a continuous determination of the position of the blocking tappet can be especially simply implemented.

According to a further embodiment, the position determination system comprises a Hall sensor. A Hall sensor represents a frequently utilized embodiment of the magnetometer and is therefore cost-efficiently available. A Hall sensor can furthermore be especially readily installed into existing control and regulation circuitry.

A further embodiment is distinguished thereby that the Hall sensor is implemented as a 2D Hall sensor. On the one hand, a 2D Hall sensor supplies only a few data, on the other hand, these data can be supplied with only a few electrical contacts to the control and regulation circuits such that the cabling expenditures can be kept low. Moreover, the computing capacity necessary for processing the signals can be kept low. This also contributes to decreasing the reaction time.

A further developed embodiment is distinguished thereby that the first magnet and the second magnet are disposed in the blocking tappet such that like poles are directed toward one another. In this configuration a change of the magnetic field due to a position change of the blocking tappet can be detected especially easily. In particular, high resolution can be achieved such that the current position of the blocking tappet can be determined especially accurately. The reaction time of the blocking device can hereby also be decreased since it is possible to detect very quickly whether or not the blocking tappet has released the ratchet gear.

According to a further embodiment the blocking tappet is at least partially developed as an injection molded part, wherein the first magnet and the second magnet can be overmolded during the injection molding of the blocking tappet. Developing the blocking tappet as an injection molded part has the advantage that a large number of pieces can be produced cost-effectively. A steel insert can herein be provided in order to equip the blocking tappet with the requisite strength. In the event the two marker regions are formed by the magnets, it is advisable to magnetize the two magnets only after the fabrication of the blocking tappet has been completed so that when emplacing the two magnets into the injection molds the orientation of the magnets does not need to be taken into consideration.

A further embodiment is distinguished thereby that the position determination system comprises a temperature measuring system. Since the blocking device is disposed in the proximity of the brake disk of the electromechanical service brake, high temperature fluctuations can occur during operation of the motor vehicle. By means of the temperature measuring system effects of temperature on the determination of the position of the blocking tappet can be taken into consideration and be eliminated.

In a further developed embodiment the moving system comprises a direct current motor. Direct current motors are especially cost-effective such that in this embodiment the blocking device can be provided at low financial expenditures.

One development of the disclosure relates to an electromechanical service brake for a motor vehicle, comprising a brake unit for braking a wheel of the motor vehicle, a drive unit for providing a brake torque, with which the wheel can be braked, a power train cooperating with the drive unit, with which the brake torque for actuating the brake unit can be transmitted to the brake unit, and a blocking device according to one of the preceding embodiments. The technical effects and advantages that can be attained with the proposed electromechanical service brake correspond to those that have been discussed for the present blocking device. In summary, it is to be pointed out that, due to the fact that the position of the blocking tappet can be determined continuously, data is available at any time regarding whether or not the blocking tappet of the ratchet gear is blocked or released. The electromechanical service brake can be operated with a decreased reaction time, which is reflected in increased (operator) driving comfort when starting the motor vehicle.

It is provided in a further development that the electromechanical service brake comprises a control unit for activating the drive unit, wherein the position determination system cooperates with the control unit. The use of the control unit cooperating with the position determination system enables using the data about the position of the blocking tappet for various purposes. For example, the control unit can carry out the automatic activation of the blocking device if the control unit detects that the motor vehicle has been stationary for a relatively long time, however, that the blocking device has not been actuated. This may, for example, occur after emergency braking due to an accident in which the driver has lost consciousness and was not able to actuate the blocking device himself. It is hereby prevented that the motor vehicle rolls off after the emergency braking.

A further advanced development specifies that the control unit and the position determination system are equipped such that the determination of the position of the blocking tappet is carried out by means of a first state and a second state. The first state describes herein, for example, the positions of the blocking tappet in which the ratchet gear is blocked and the second state describes the positions of the blocking tappet in which it releases the ratchet gear. It is therefore not necessary in this development to determine a numeric value for each position of the blocking tappet.

Rather, it is sufficient to obtain information regarding the blocking or release of the ratchet gear by the blocking tappet. The requisite data volumes are hereby reduced without a function impairment occurring. The position determination system can consequently be equipped with simple and thus cost-effective components. The software can, in addition, also be kept simple. Due to the low data volumes, the required computing capacities for analyzing the signals of the position determination system are also low and, moreover, the signals of the position determination system can be analyzed rapidly, which also contributes to a reduction of the reaction time of the proposed electromechanical service brake.

One physical form of the disclosure relates to a motor vehicle comprising an electromechanical service brake as in one of the preceding developments. The technical effects and advantages that can be attained with the proposed electromechanical service brake correspond to those that have been discussed for the present blocking device. In summary, it is pointed out that, due to the fact that the position of the blocking tappet can be determined continuously, data is available at any time of whether the blocking tappet blocks or releases the blocking tappet of the ratchet gear. The electromechanical service brake can be operated at a reduced reaction time which is reflected, in particular, in increased driving comfort during start-ups.

BRIEF DESCRIPTION OF THE DRAWINGS

Exemplary embodiments of the present application will be explained in the following with reference to the attached drawing. Therein depict.

DETAILED DESCRIPTION

Figure 1:
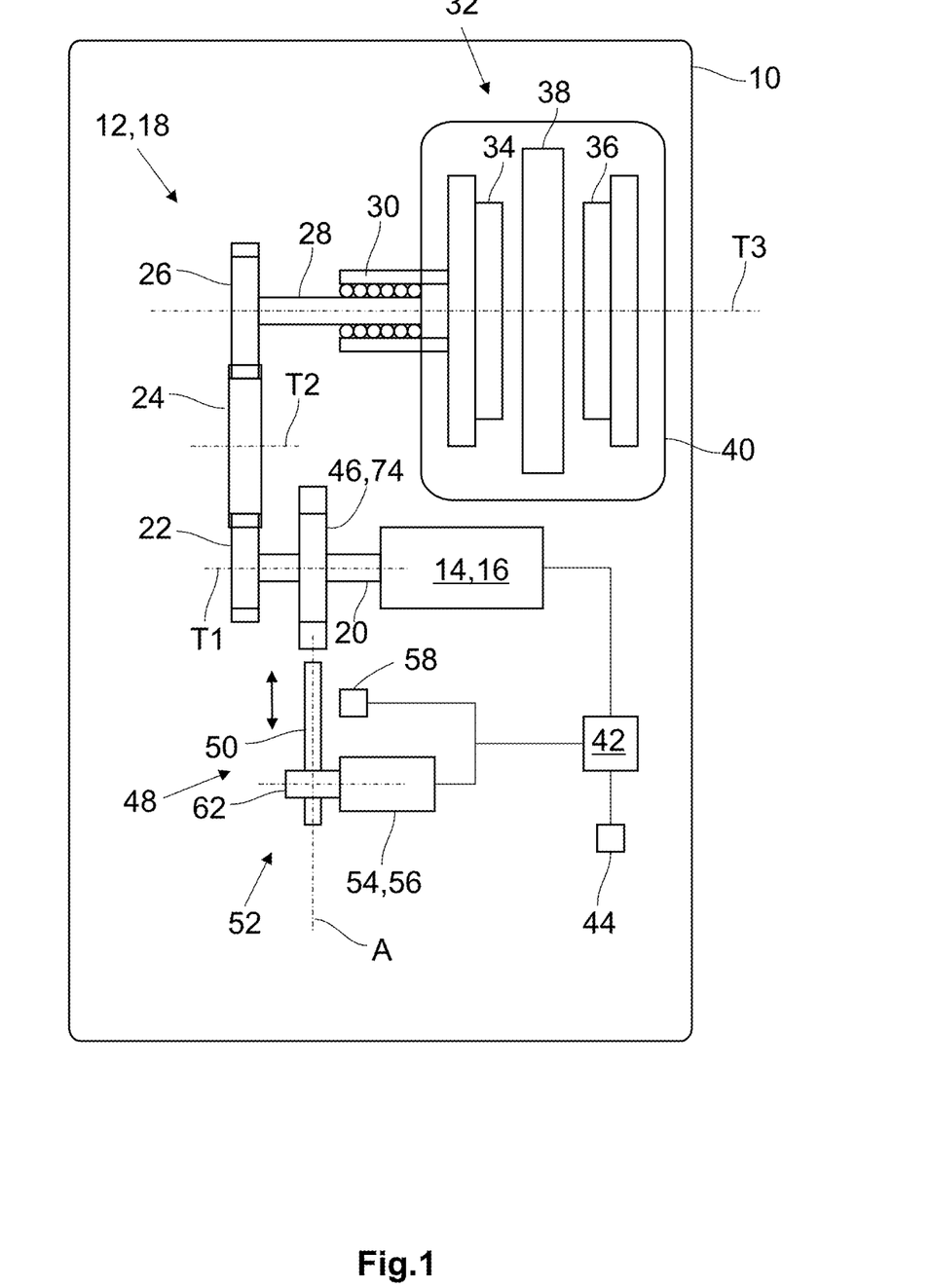
FIG. 1 a basic view onto a motor vehicle which comprises an electromechanical service brake with a blocking device according to the disclosure, FIG. 2A a basic representation of an embodiment of the blocking device, wherein the blocking device is in a first position, FIG. 2B a basic representation of the change of the strength of the magnetic field as a function of distance, wherein the strength of the magnetic field resulting in the first position is indicated, FIG. 3A a basic representation of the blocking device depicted in FIG. 2 located in an intermediate position, FIG. 3B a basic representation of the change of the strength of the magnetic field as a function of distance, wherein the strength of the magnetic field resulting in the intermediate position is indicated, FIG. 4A a basic representation of the blocking device depicted in FIG. 2 that is in a second position, FIG. 4B a basic representation of the change of the strength of the magnetic field as a function of distance, wherein the strength of the magnetic field resulting in the second position is indicated, FIG. 5 a separate basic representation of an embodiment of the position determination system.

FIG. 1 shows a basic view onto a motor vehicle 10 which comprises an electromechanical service brake 12 according to the disclosure. The electromechanical service brake 12 comprises herein a drive unit 14 which, for example, can comprise an electric motor 16 that cooperates with a power train 18. The power train 18 in this case comprises a drive shaft 20 connected torque-proof with a first spur gear 22. The first spur gear 22 is in meshing engagement with a second spur gear 24 which, in turn, is in meshing engagement with a third spur gear 26. The drive shaft 20 and the first spur gear 22 herein rotate about a first rotational axis T1, wherein the second spur gear 24 and the third spur gear 26 rotate about a second rotational axis T2 or respectively about a third rotational axis T3, which extend substantially parallel to the first rotational axis T1. The third spur gear 26 is connected torque-proof with a spindle 28 which is in meshing engagement with a spindle sleeve 30. The spindle sleeve 30 cooperates with a brake unit 32 which, in this case, comprises a not shown brake caliper with which a first brake pad 34 and a second brake pad 36 are movable along the third rotational axis T3. Between the first brake pad 34 and the second brake pad 36 is disposed a brake disk 38 which is connected torque-proof with a wheel 40 of the motor vehicle 10.

The electric motor 16 is connected with a control unit 42 with which the electric motor 16 can be activated. The activation can take place upon demand by the driver of the motor vehicle 10 or automatically based on the particular driving situation. The service brake 12 comprises, in addition, a temperature measuring system 44 whose function will be discussed later.

When the electric motor 16 is activated, it rotates the drive shaft 20 and the first spur gear 22 in a first direction. This rotation is transmitted via the second spur gear 24 onto the third spur gear 26 and consequently onto the spindle 28. The rotational movement of spindle 28 is converted from such rotation into an axial movement of the spindle sleeve 30 directed along the third rotational axis T3. This axial movement is transmitted onto the first brake pad 34. The axial movement of the first brake pad 34 is transmitted by means of the brake caliper onto the second brake pad 36 such that it moves axially opposite to the first brake pad 34.

In FIG. 1 between the two brake pads 34, 36 and the brake disk 38 a gap is provided in order for the brake disk 38 to be able to rotate unhindered. The wheel 40, and consequently the motor vehicle 10, are consequently not braked. With the appropriate activation of the electric motor 16, however the two brake pads 34, 36 are moved toward the brake disk 38 until they are in contact on the brake disk 38 and are pressed against it. Due to the generated friction, the brake disk 38, and consequently the wheel 40, of the motor vehicle 10 are braked.

Figure 3A:
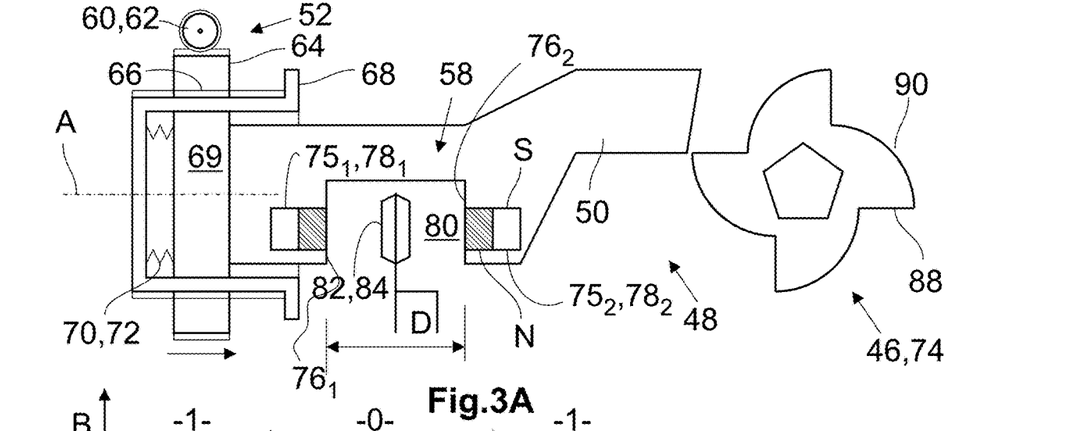
Figure 4A:
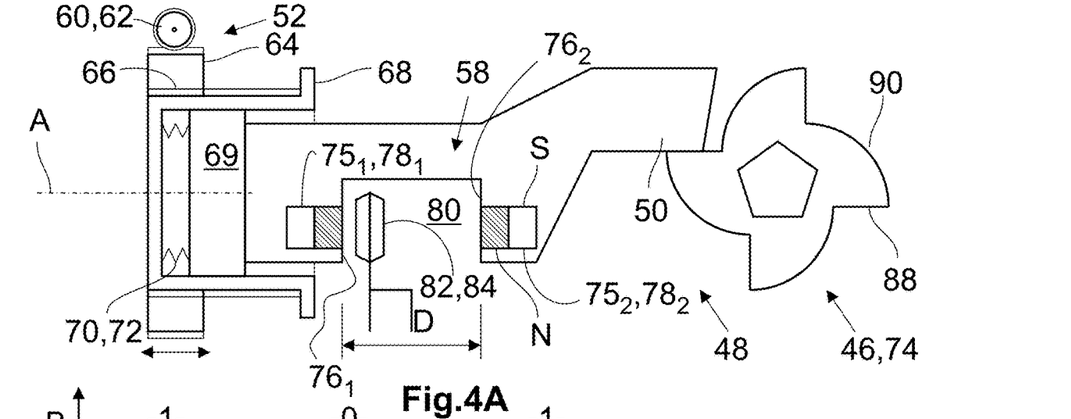

Moreover, a ratchet gear 46 is connected torque-proof with the drive shaft 20 of the electric motor 16. A blocking device 48 cooperates with this ratchet gear 46 which can subsequently be activated after the motor vehicle 10 has come to a standstill. The blocking device 48 comprises a blocking tappet 50 which can be moved along a displacement axis A by means of a moving system 52. For this purpose the moving system 52 comprises a drive motor 54, in this case implemented as a direct current motor 56. In the depicted example the displacement axis A extends approximately perpendicularly to the first rotational axis T1, wherein other courses, in particular a parallel course, are also conceivable. The moving system 52 can move the blocking tappet 50 between a first position (see FIG. 2A), in which the blocking tappet 50 releases the ratchet gear 46, and a second position (FIG. 4A), in which the blocking tappet engages blockingly into the ratchet gear 46, wherein the blocking tappet 50 can assume intermediate positions of which one is depicted in FIG. 3A. When the blocking tappet 50 engages into the ratchet gear 46, the ratchet gear 46 is no longer able to rotate. Due to the fact that the ratchet gear 46 is connected torque-proof with the drive shaft 20, the two brake pads 34, 36 can also no longer be moved.

To park or lock the motor vehicle 10, first the particular brake unit 32 is activated such that the two brake pads 34, 36 are in contact on the brake disk 38, should that not have been the case already. During the standing still of the motor vehicle 10 the control unit 42 automatically, or upon the demand by the driver, actuates the moving system 52 such that the blocking tappet 50 is moved from the first position into the second position and, consequently, engages into the ratchet gear 46. The entire service brake 12 can subsequently be disconnected from power without the two brake pads 34, 36 being capable of being moved. The motor vehicle 10 is thus locked independently of whether the service brake 12 is connected to power or not.

For the release of the blocking device 48, it is actuated by the control unit 42 in reverse order such that the blocking tappet 50 is moved out of the second position into the first position. In the first position the blocking tappet 50 releases the ratchet gear 46 such that it can move again about the first rotational axis T1. This results in the drive shaft 20, and consequently the first spur gear 22, the second spur gear 24, the third spur gear 26 and the spindle 28 being able to rotate again such that the brake pads 34, 36 can also be moved axially. The motor vehicle 10 can now be moved again.

The blocking device 48 according to the disclosure comprises a position determination system 58 with which the position of the blocking tappet 50 can be determined. The data with respect to the position of the blocking tappet 50 are transmitted to the control unit 42.

Figure 2A:
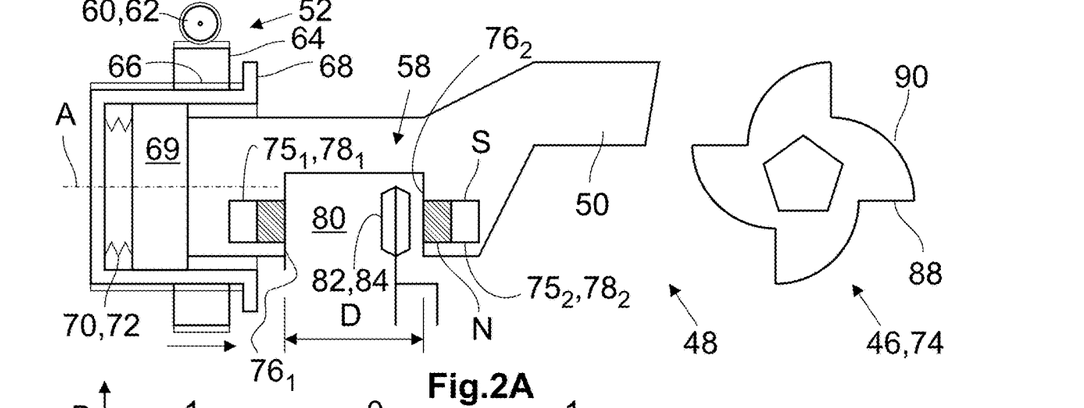

In FIG. 2A is depicted a basic representation of an embodiment example of the blocking device 48 according to the disclosure. The moving system 52 comprises a worm gear 60 which is connected torque-proof with a drive shaft 62 of the direct current motor 56. The worm gear 60 is in meshing engagement with a spindle nut 64 which comprises an internal screw thread 66 which is in engagement with an external screw thread of an axially movably supported setting sleeve 68. The blocking tappet 50 is connected axially displaceably with the setting sleeve 68 by a securement section 69. The blocking tappet 50 is furthermore prestressed with a prestress device 70 which can comprise a number of springs 72.

When the direct current motor 56 is activated, the rotation of the worm gear 60 is transmitted to the spindle nut 64, wherein the rotation of the spindle nut 64 leads to a displacement of the setting sleeve 68 along the displacement axis A. The axial displacement of the setting sleeve 68 is transmitted to the blocking tappet 50 such that it moves along the displacement axis A toward the ratchet gear 46, which in this case is developed as a ratchet wheel 74, or away from the ratchet gear 46. The securement section 69 and the prestress device 70 are set up such that the setting sleeve 68 and the blocking tappet 50 move synchronously along the displacement axis A, unless extraordinary forces act onto the blocking tappet 50 which will be discussed in greater detail further down.

In the depicted embodiment example the blocking tappet 50 has a first marker face $76_1$ and a second marker face $76_2$ that extend perpendicularly to the displacement axis A. The blocking tappet 50 furthermore comprises a first marker region $75_1$ and a second marker region $75_2$ which in this case are formed by a first magnet $78_1$ or respectively a second magnet $78_2$. The first magnet $78_1$ and the second magnet $78_2$ are disposed such that they cooperate across the first marker face $76_1$ and the second marker face $76_2$ with the position determination system 58, which is disposed between the first and the second marker face $76_1$ and $76_2$. The first magnet $78_1$ and the second magnet $78_2$ are oriented such that the like poles of the two magnets $78_1$, $78_2$, in this case the north poles N, are directed toward one another. The blocking tappet 50 can at least partially be produced using an injection molding process. The two magnets $78_1$, $78_2$ can be overmolded. It is advisable to magnetize the two magnets $78_1$, $78_2$ only after the blocking tappet 50 has been completed so as not to have to consider the orientation of the magnets $78_1$, $78_2$ when placing the two magnets into the injection mold.

In the depicted embodiment example the first and the second marker faces $76_1$, $76_2$ form a portion of a recess 80 of the blocking tappet 50.

In the depicted embodiment example the position determination system 58 comprises a Hall sensor 82, in this case a 2D Hall sensor 84, with which the magnetic field forming between the two magnets $78_1$, $78_2$ can be measured. In particular changes in the strength of the magnetic field can be registered. The Hall sensor 82 is disposed stationarily with respect to the blocking tappet 50.

Figure 2B:
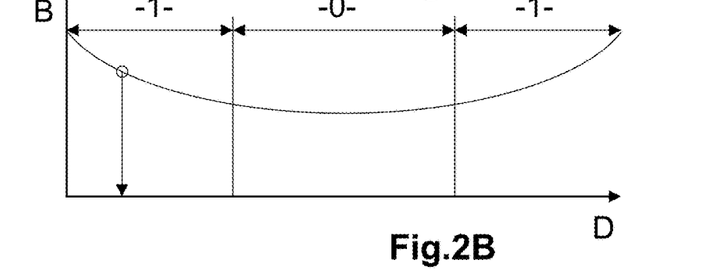

In FIG. 2B is plotted the developing strength of the magnetic field B as a function of the distance of D of the two magnets from the 2D Hall sensor 84. When the blocking tappet 50 assumes the first position depicted in FIG. 2A, the second magnet $78_2$ is located comparatively close to the 2D Hall sensor 84 which is why the strength of the magnetic field B, marked by the circle, is comparatively high in this position.

If, due to an activation of the direct current motor 56, the blocking tappet 50 is moved from the first position toward the ratchet gear 46 into the intermediate position depicted in FIG. 3A, the distance of D between the 2D Hall sensor 84 and the second magnet $78_2$ increases. Consequently, the strength of the magnetic field B registered by the 2D Hall sensor 84 decreases. When the blocking tappet 50 is moved further in the direction of the ratchet gear 46 into the second position depicted in FIG. 4A, the distance between the Hall sensor 82 and the second magnet $78_2$ increases further, however, the distance to the first magnet $78_1$ decreases simultaneously which is the reason the strength of the magnetic field B registered by the Hall sensor 82 increases again.

Figure 3B:
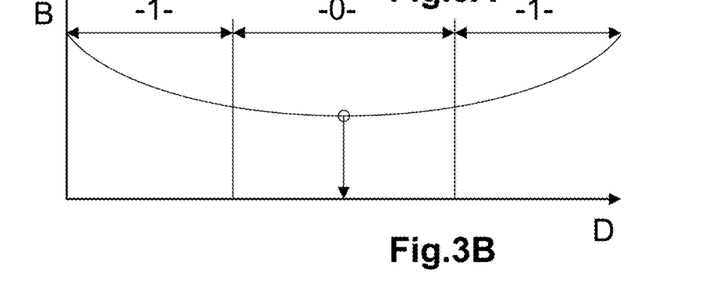
Figure 4B:
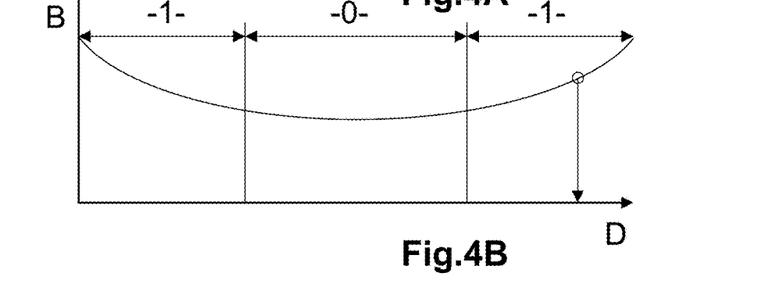

The result is a U-shaped curve profile of the strength of the magnetic field B over the distance of D. In FIGS. 2B, 3B and 4B is evident that the curve profile of the strength of the magnetic field over the distance of the position determination system 58 from the first magnet $78_1$ and from the second magnet $78_2$ is divided into three segments. The left segment is associated with state "1", the middle segment with state "0" and the right segment again with state "1". In a teaching routine the 2D Hall sensor 84 is set such that, in the event the strength of the magnetic field exceeds a selectable threshold value, state "1" is transmitted to the control unit 42 and, in the event the strength of the magnetic field falls below the threshold value, transmits state "0" to the control unit 42. The position of the blocking tappet 50 is consequently only determined based on two states. It is therefore not necessary to determine an absolute value for the strength of the magnetic field B, a value for the change of magnetic field B or similar values. The data volume to be transmitted is hereby kept low and the use of the simply structured 2D Hall sensor 84, that manages to operate with two electrical connections 86 (see FIG. 5), makes it possible that, in addition, the cabling expenditures are also kept low.

The three sections are selected such that in the case the 2D Hall sensor 84 determines state "1", the blocking tappet 50 engages definitely into the ratchet gear 46 and consequently blocks the brake unit 32 or the blocking tappet 50 definitely releases the ratchet gear 46. In case the 2D Hall sensor 84 determines state "0", it cannot be uniquely determined whether or not the blocking tappet 50 engages into the ratchet gear 46 or releases it.

In the case in which the 2D Hall sensor 84 determines state "1" in order to state precisely whether or not the blocking tappet 50 engages into the ratchet gear 46 or the blocking tappet 50 releases the ratchet gear 46, the following additional data can be utilized: to move the blocking tappet 50 from the first into the second position, the direct current motor 56 must rotate the drive shaft 62 in a first direction, whereas to move the blocking tappet 50 from the second into the first position, the direct current motor 56 must be operated such that the drive shaft 62 is rotated into an opposite second direction. If, consequently, the direct current motor 56 is, for example, rotated into the first direction, the blocking tappet 50 moves herein from the first into the second position. The direction in which the direct current motor 56 rotates is known to the control unit 42, which is the reason this unit can differentiate these two initially equal states "1".

As already stated, first a teaching routine is run through. Herein a counter can be started, for example in the first position, wherein the counter counts how many times the state "1" has been determined. To even-numbered counter counts can be assigned, for example, a release of the ratchet gear 46, and to odd-numbered counter counts a blocking of the ratchet gear 46.

As is especially evident in FIG. 3A, the ratchet gear 46 is in an ideal position if one of the, in this case, four substantially planar blocking faces 88, with which the blocking tappet 50 cooperates for blocking the ratchet gear 46, extends parallel to the displacement axis A. As is also evident, for example in FIG. 3A, between two adjacent blocking faces 88 extends a convex ratchet gear face 90. Since the control unit 42 not only activates the direct current motor 56 but also the electric motor 16 of the service brake 12, the control unit 42 can, before the start of the locking of the brake unit 32, set the ratchet gear 46 into the ideal position shown in FIGS. 2A, 3A and 4A such that the blocking tappet 50, as shown in these Figures, can optimally drive onto the blocking faces 88 and engage into the ratchet gear 46. Due to the convex ratchet gear faces 90, a certain deviation from the ideal position can be accepted. However, if the ratchet gear 46, in reference to the ideal position shown in FIGS. 2A, 3A and 4A, comes to a standstill rotated by a few degrees further to the right, the blocking tappet 50 abuts onto the section of the convex ratchet gear faces 90 directly adjacent to the blocking face 88. In this case the springs 72 of the prestress device 70 are compressed such that the blocking tappet 50 and the ratchet gear 46 are not damaged. The blocking tappet 50 remains standing in the intermediate position shown in FIG. 3A without reaching the second position. As stated above, the blocking device 48 according to the disclosure has a reaction time of 0.3 second or less. If the control unit 42 registers that the signal from the 2D Hall sensor 84 has indeed changed from the state "1" into the state "0", however within the reaction time it has not changed again into the state "1", this can be interpreted as a fault that indicates a position of the ratchet gear 46 deviating from the ideal position. In this case the direct current motor 56 is operated by the control unit 42 such that the blocking tappet 50 is moved back again into the first position. The electric motor 16 is subsequently activated such that the ratchet gear 46 is minimally rotated and the blocking tappet 50 can engage as intended. In this case the above described assignment of even and odd counter counts can be updated.

In addition to the avoidance of damages, the prestress device 70 has also the following further functions: especially when the blocking device 48 is activated after a relatively long drive of the motor vehicle 10, the service brake 12, due to the friction acting onto the brake disk 38, may have become very hot. The service brake 12 cools down again during the standstill of the motor vehicle 10, whereby contraction processes may occur. Due to the prestress force applied by the prestress device 70, it is prevented that the engagement of the blocking tappet 50 into the ratchet gear 46 is cancelled.

The temperature measuring system 44 is also provided due to the intense temperature fluctuations. The temperature can impact the data determined by the 2D Hall sensor 84, wherein the effect of the temperature can be eliminated by means of the temperature measuring system 44.

Figure 5:
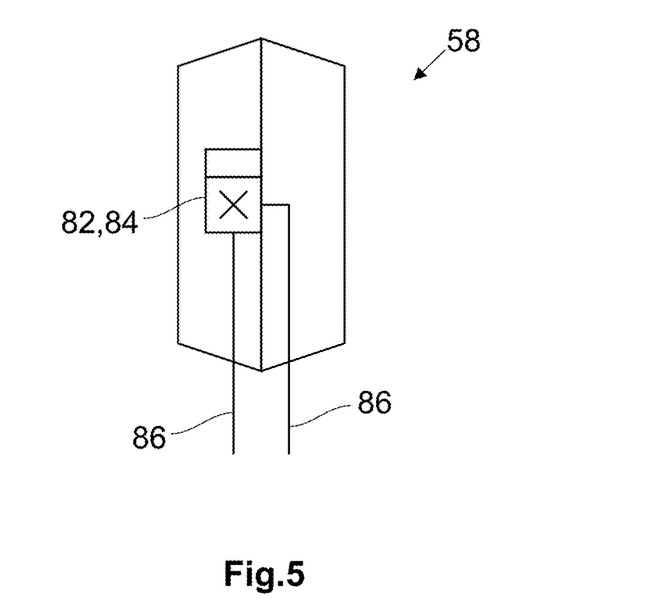

In FIG. 5 the 2D Hall sensor 84 is shown in isolation. It can be seen that it suffices with two electrical connections 86, and that it comprises marked side.

LIST OF REFERENCE SYMBOLS

10 Motor vehicle
12 Service brake
14 Drive unit
16 Electric motor
18 Power train
20 Drive shaft
22 First spur gear
24 Second spur gear
26 Third spur gear
28 Spindle
30 Spindle sleeve
32 Brake unit
34 First brake pad
36 Second brake pad
38 Brake disk
40 Wheel of motor vehicle
42 Control unit
44 Temperature measuring system
46 Ratchet gear
48 Blocking device
50 Blocking tappet
52 Moving system
54 Drive motor
56 Direct current motor 58 Position determination system
60 Worm gear
62 Drive shaft
64 Spindle nut
66 Internal screw thread
68 Setting sleeve
69 Securement section
70 Prestress device
72 Spring
74 Ratchet wheel
75 Marker region
$75_1$ First marker region
$75_2$ Second marker region
76 Marker face
$76_1$ First marker face
$76_2$ Second marker face
78 Magnet
$78_1$ First magnet
$78_2$ Second magnet
80 Recess
82 Hall sensor
84 2D Hall sensor
86 Connection
88 Blocking face
90 Ratchet gear face
A Displacement axis
B Strength of magnetic field
D Distance
N North pole
S South pole
T1 First rotational axis
T2 Second rotational axis
T3 Third rotational axis

The invention claimed is:

1. A blocking device for an electromechanical service brake with a ratchet gear that is supported rotatably about a rotational axis, which is connected torque-proof with a drive shaft, wherein the drive shaft is rotatable about the rotational axis of a power train of the electromechanical service brake, wherein the blocking device comprises:
a blocking tappet which is movable axially along a displacement axis between a first position, in which the blocking tappet releases the ratchet gear, and a second position in which the blocking tappet blocking engages into the ratchet gear,
a moving system for moving the blocking tappet along the displacement axis,
a position determination system for determining the position of the blocking tappet, and
wherein the blocking tappet comprises a marker face extending perpendicularly to a direction of motion, across which the marker region cooperates with the position determination system.

2. The blocking device of claim 1, wherein the blocking tappet comprises a marker region that cooperates with the position determination system for the determination of the position of the blocking tappet.

3. The blocking device of claim 1, wherein the blocking tappet comprises two marker faces extending parallel to one another, wherein the first marker face is assigned a first marker region and to the second marker face is assigned a second marker region.

4. The blocking device of claim 3, wherein the position determination system is at least partially disposed between the two marker faces.

5. The blocking device of 3, wherein the first marker region is a first magnet and the second marker region is a second magnet.

6. The blocking device of claim 5, wherein the position determination system comprises a Hall sensor.

7. The blocking device of claim 6, wherein the Hall sensor is implemented as a 2D Hall sensor.

8. The blocking device of claim 7, wherein the first magnet and the second magnet are disposed in the blocking tappet such that their like poles are oriented toward one another.

9. The blocking device of claim 7, wherein the blocking tappet is developed at least partially as an injection molded part and the first magnet and the second magnet are over-molded during injection molding of the blocking tappet.

10. The blocking device of claim 1, wherein the position determination system comprises a temperature measuring system.

11. The blocking device of claim 1, wherein the moving system comprises a DC motor.

12. A electromechanical service brake for a motor vehicle comprising
a brake for braking a wheel of the motor vehicle,
a drive for providing a brake torque, with which the wheel is brakeable,
a power train cooperating with the drive, with which the brake torque, for actuating the brake, can be transmitted to the brake,
a ratchet gear, supported rotatably about a rotational axis, which is torque-proof connected with a drive shaft of the power train, and which is rotatable about the rotational axis, and
a blocking device comprising:
a blocking tappet which is movable axially along a displacement axis between a first position, in which the blocking tappet releases the ratchet gear, and a second position in which the blocking tappet blocking engages into the ratchet gear,
a moving system for moving the blocking tappet along the displacement axis,
a position determination system for determining the position of the blocking tappet, and
wherein the blocking tappet comprises a marker face extending perpendicularly to a direction of motion, across which the marker region cooperates with the position determination system.

13. The electromechanical service brake of claim 12, wherein the electromechanical service brake comprises a control system for activating the drive, wherein the position determination system cooperates with the control system.

14. The electromechanical service brake of claim 13, wherein the control system and the position determination system are set up such that the determination of the position of the blocking tappet is carried out based on a first state and a second state.

15. A motor vehicle comprising:
an electromechanical service brake for a motor vehicle comprising:
a brake for braking a wheel of the motor vehicle,
a drive for providing a brake torque, with which the wheel is brakeable,
a power train cooperating with the drive, with which the brake torque, for actuating the brake, can be transmitted to the brake, a ratchet gear, supported rotatably about a rotational axis, which is torque-proof connected with a drive shaft of the power train, and which is rotatable about the rotational axis, and a blocking device comprising:
- a blocking tappet which is movable axially along a displacement axis between a first position, in which the blocking tappet releases the ratchet gear, and a second position in which the blocking tappet blocking engages into the ratchet gear,
- a moving system for moving the blocking tappet along the displacement axis,
- a position determination system for determining the position of the blocking tappet, and
- wherein the blocking tappet comprises a marker face extending perpendicularly to a direction of motion, across which the marker region cooperates with the position determination system.

* * * * *